United States Patent [19]

Kobunaya

[11] Patent Number: 5,663,948
[45] Date of Patent: Sep. 2, 1997

[54] COMMUNICATION DATA RECEIVER CAPABLE OF MINIMIZING THE DISCARDING OF RECEIVED DATA DURING AN OVERFLOW

[75] Inventor: Hideki Kobunaya, Tokyo, Japan

[73] Assignee: NEC Corporation, Tokyo, Japan

[21] Appl. No.: 456,691

[22] Filed: Jun. 1, 1995

[30] Foreign Application Priority Data

Jun. 1, 1994 [JP] Japan .................................. 6-140741

[51] Int. Cl.⁶ ............................................... H04L 12/54
[52] U.S. Cl. ........................... 370/229; 370/429; 370/503
[58] Field of Search .............................. 370/60, 60.1, 61,
370/94.1, 94.2, 100.1, 103, 105.1, 105.4,
106, 112, 113, 47, 48, 99, 108; 375/365,
360, 361, 370, 372; 395/849, 119, 856,
115.2, 827, 307, 877, 182.08, 881, 800;
371/5.4; 365/14.9, 230.06, 228.3, 231.9,
232.8

[56] References Cited

U.S. PATENT DOCUMENTS 4,603,416  7/1986  Sequel et al. .......................... 370/60
4,947,388  8/1990  Kuwahara et al. .................... 370/60

FOREIGN PATENT DOCUMENTS 4-58646    2/1992  Japan .
4-242348   8/1992  Japan .

*Primary Examiner*—Dang Ton
*Attorney, Agent, or Firm*—Foley & Lardner

[57] ABSTRACT

A communication data receiver comprises a counter for generating a write address on a buffer memory for communication cell data according to a write signal directing the communication cell data to be written into the buffer memory, a latch circuit for holding a write address for start communication cell data being written, an overflow detection circuit for detecting an overflow of the buffer memory, a circuit for prohibiting communication cell data from being written into the buffer memory according to an overflow detection signal, and a circuit for setting a write address held in the latch circuit as a writing start address for the next received communication cell data in the counter according to the overflow detection signal.

14 Claims, 15 Drawing Sheets

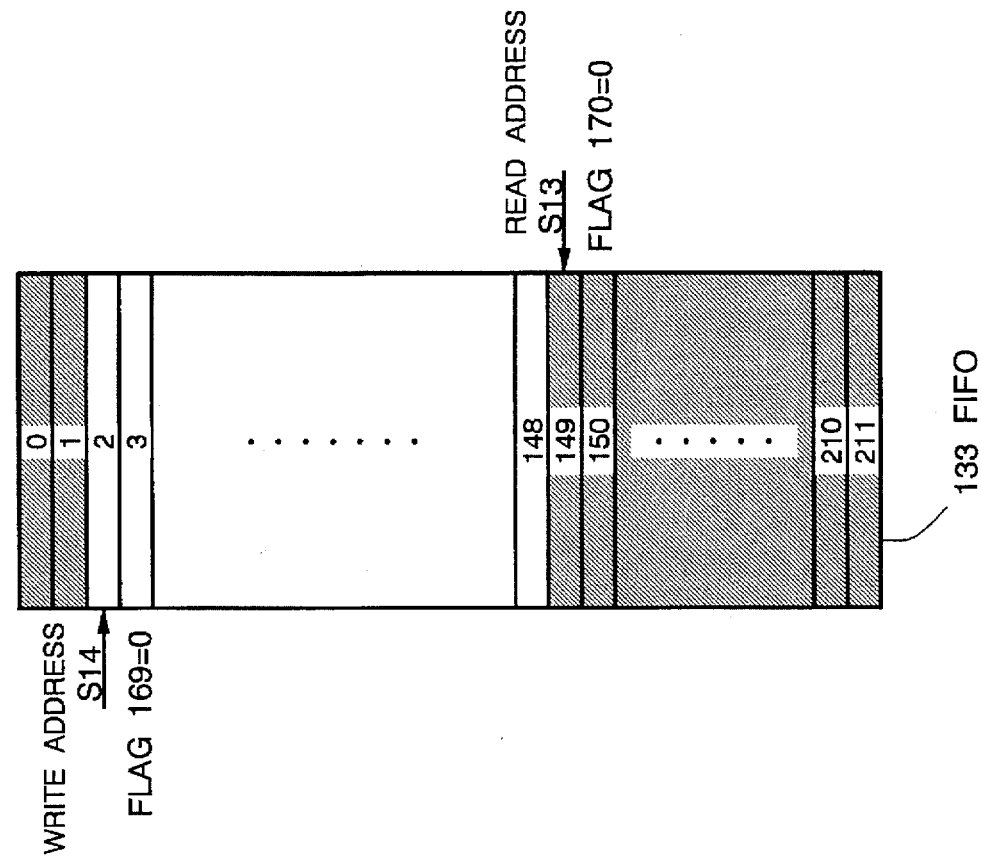
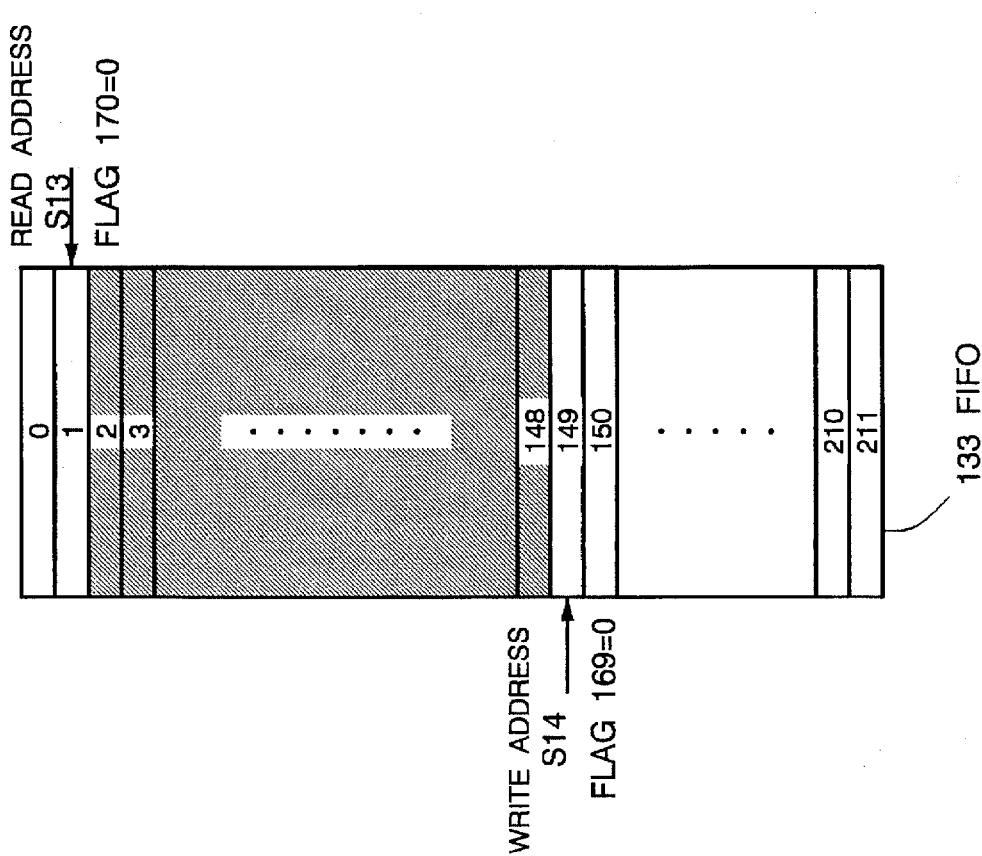

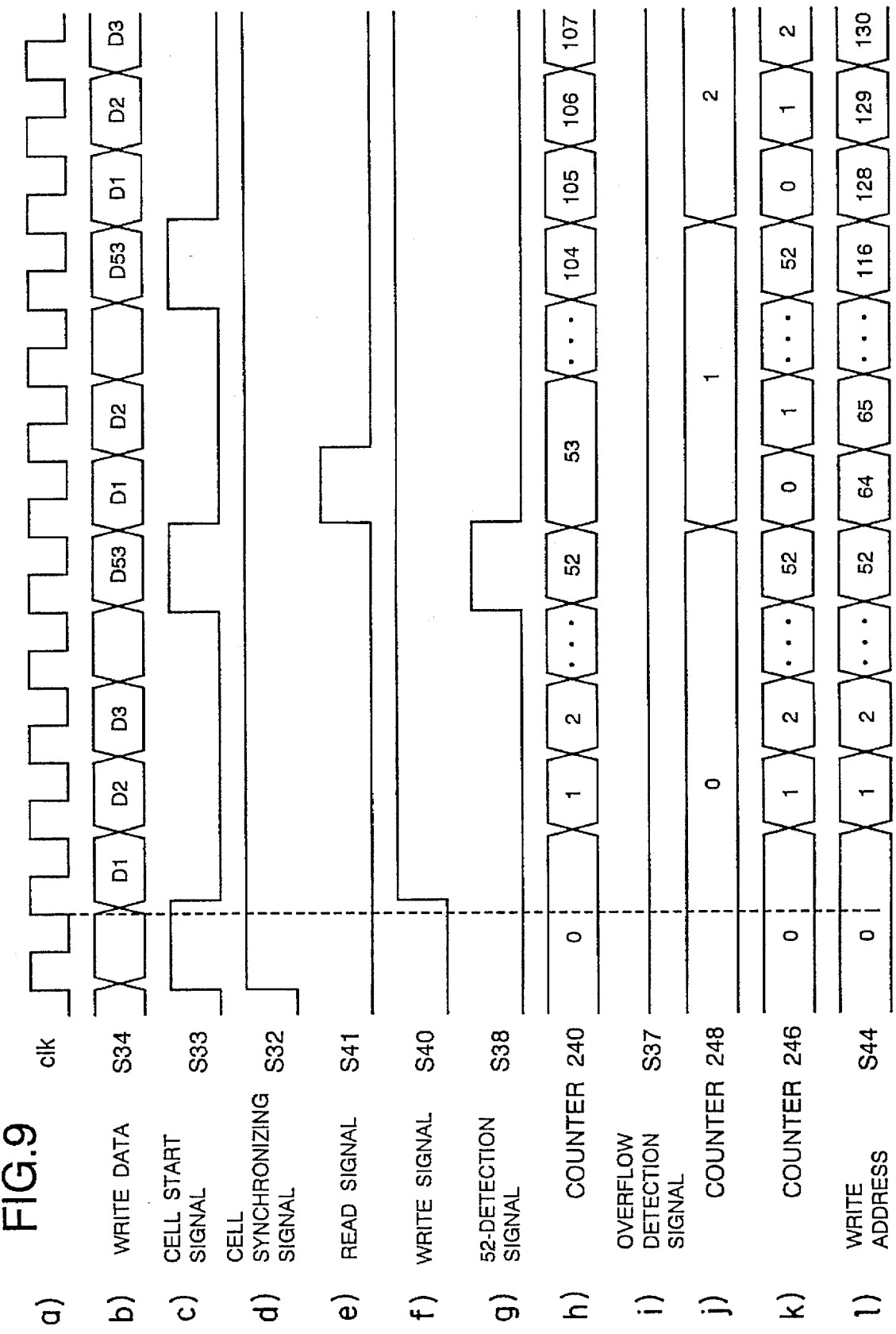

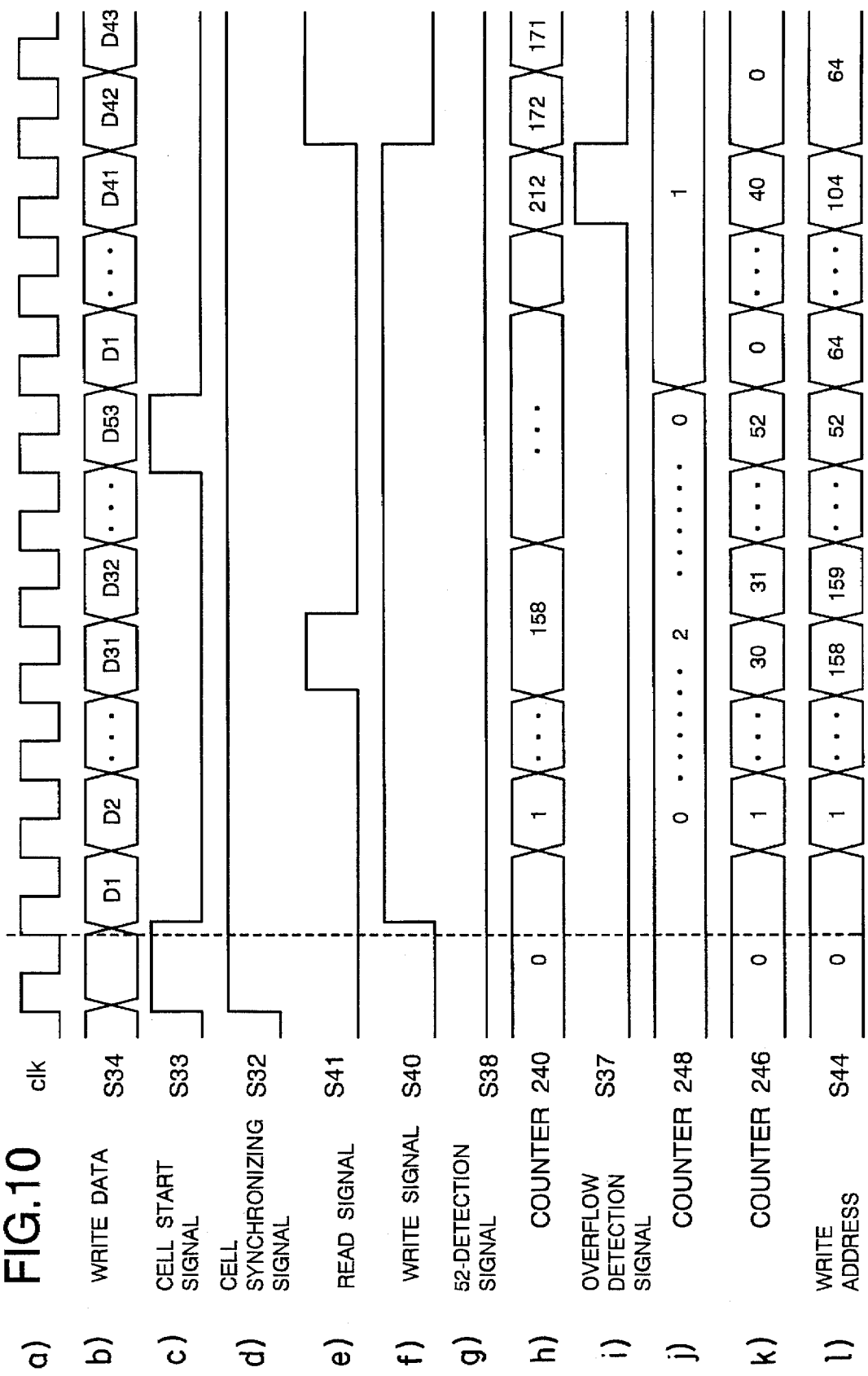

COMMUNICATION DATA RECEIVER CAPABLE OF MINIMIZING THE DISCARDING OF RECEIVED DATA DURING AN OVERFLOW

BACKGROUNDS OF THE INVENTION

1. Field of the Invention

The present invention relates to a communication data receiver and a buffer control method, in particular to a data receiver that transfers data from a physical layer via a buffer memory to an ATM layer, and to a buffer control method.

2. Description of the Related Art

FIG. 12 provides a block diagram indicating the configuration of the conventional communication data receiver. In FIG. 12, a received cell 801 is entered to a cell synchronous circuit 802 which in turn generates a cell synchronizing signal 803 and a cell start signal 804. Further, the cell synchronous circuit supplies a first-in first-out type buffer memory with write data 805. The cell synchronizing signal 803 and the cell start signal 804 are entered to an AND circuit 806. An output signal 807 from the AND circuit 806 sets an SR flip flop 817.

A write stop signal 811 as the control signal used to stop programming FIFO buffer memory 857, an overflow detection signal 826 output upon the detection of an overflow, and a 52-detection signal 814 are entered to an OR circuit 873. The SR flip flop 817 is reset by an output signal 874 from the OR circuit 873. A write restart signal used to control the restart of programming the FIFO buffer memory 857, and the output signal 807 from the AND circuit 806 may be entered to a set terminal S of the SR flip flop 817.

A write signal 818 used to control the programming of the FIFO buffer memory is output from the SR flip flop 817. A counter 820 is incremented by the write signal 818. An output signal 821 from the counter 820 is entered to a 52-detection section. When the counter 820 reads a value of "52", the 52-detection signal 814 is output. The counter 820 is reset by the 52-detection signal 814.

A counter 855 is incremented by the write signal 818 and reset by the overflow detection signal 826. A counter 853 is incremented when a read signal 819 is active, and reset by the overflow detection signal 826. Signals from the counters 855 and 853 are output as a write address 856 and a read address 854 for the FIFO buffer memory 857, respectively.

A counter 823 is incremented by the write signal 818, decremented by the read signal 819, and reset by the overflow detection signal 826. An overflow detection section 825 generates the overflow detection signal 826 in response to an output signal 824 from the counter 823. The conventional data receiver shown in FIG. 12, each of the flip flop and counters is operated by a system clock clk.

FIG. 13 provides a timing chart helping understand the normal operation of the conventional data receiver. FIG. 14 provides a timing chart helping understand the abnormal operation of such data receiver, i.e. an overflow occurring in the FIFO buffer memory 857.

FIGS. 12, 13 and 15 are used to explain the normal operation of the conventional data receiver. Received data 801 is composed of ATM cells, each of which comprises 53 bytes of data, 5 bytes of a header section and 48 bytes of payload section, as shown in FIG. 15.

The cell synchronous circuit 802 performs CRC operation on five bytes of received data 801. If the result is "0", the cell synchronous circuit regards the five bytes as the header of the ATM cell. Further, the cell synchronizing signal 803, the cell start signal 804, and write data 805 are generated in the timing shown in FIG. 13. The cell synchronizing signal can also be generated when a series of cells of the cell start signal 804 is detected.

When the cell synchronizing signal 803 and the cell start signal 804 become active, the output signal 807 from the AND circuit 806 becomes active, with the SR flip flop 817 set and the write signal 818 becoming active.

The counter 820 is incremented by a rise in the system clock clk when the write signal 818 is active. The counter 820 is reset by the 52-detection signal 814 when it reads a count value of "52". The 52-detection signal 814 resets the SR flip flop 817 via the OR circuit 873. When the FIFO buffer memory 857 is programmed with 53 bytes of write data 805, the 52-detection signal 814 attempts to inactivate the write signal 818.

In the example illustrated in FIG. 13, the cell start signal 804 becomes active in the same timing as the 52-detection signal 814. Further, the output signal 807 from the AND circuit 806 providing the logical product of the cell start signal 804 and the cell synchronizing signal 803 becomes active. In addition, as the SR flip flop 817 is set initially, the write signal 818 is held active (high in FIG. 13). This is because a series of ATM cells (input data 801) is entered.

The write address 856 given from the counter 855 is incremented by a rise in the system clock clk when the write signal 818 is active. The read address 854 given from the counter 853 is incremented by a rise in the system clock clk when the read signal 819 is active.

A counter 23 controls the number of bytes of data stored in the FIFO buffer memory 857. The counter 823 is incremented by a rise in the system clock clk when the write signal is active, and decremented by a rise in the system clock clk when the read signal 819 is active.

Then, FIGS. 12 and 14 are used to explain the abnormal operation of the conventional data receiver, i.e. an overflow occurring in the FIFO buffer memory 857. This explanation assumes that the size of the FIFO buffer memory 857 is four cells (=212 bytes) and that data is written to and read from the FIFO buffer memory 857 as if the data receiver were operated normally. When the counter 23 reads a value of "212" (indicating that the FIFO buffer memory 857 is filled), the overflow detection section 825 generates the overflow detection signal 826 as soon as the write signal 818 becomes active.

The generation of the overflow detection signal 826 is regarded as the occurrence of a fatal error, with the counters 853, 855 and 823 and the SR flip flop 817 reset. Thus, the write operation is stopped and the circuit is initialized. Then, a new ATM cell whose header has been detected restarts to be written into the FIFO buffer memory 857, and up to four cells of data are discarded.

The above conventional data receiver is such that, triggered off by the occurrence of an overflow in the FIFO buffer memory 857, the circuit used to control the buffer memory including write and read addresses is reset. This means that all the data corresponding to the size of the FIFO buffer memory 857 is discarded. The result is that high-order processing requires the resending of a large amount of data. Thus, data transfer is adversely affected significantly.

The problem consists in the fact that new input data is discarded until the release of a detected overflow. Hence, significant data may be discarded and insignificant data may not be discarded. For example, Japanese Patent Application Laid-open No. 242348/1992 comes up with countermeasures for figuring out the problem. Such countermeasures are characterized by the configuration shown in FIG. 16, providing a process for discarding excessive input data for packet communication and other highly efficient communication.

The feature of the means revealed in FIG. 16 consists in the detection of the arrival of input data by a data arrival detection circuit 981. Input data that cannot be output by the next overloaded process is stored in a buffer memory 982. A loss table 986 developed by algorithm composed of input ports, past discarded data and test patterns provides against an overflow of the buffer memory 982. The loss table is used by a loss controller 985 to control a writing counter (WCTR) 983 and a reading counter (RCTR) 984. This control allows the discard of less significant data in the buffer memory 982 and the accumulation of past discards for each input port 987. Thus, data in an input port that has undergone less discard is discarded first.

However, the data discard process shown in FIG. 16 cannot judge the importance of data before transferring data to the ATM layer processor.

Further, Japanese Patent Application Laid-open No. 58646/1992 comes up with a new buffer control means. The buffer control means adds the pre-counted data length of received packet data for storage into a transmission buffer memory and uses such data length to update a reading address during an overflow. The addition of data indicating data length requires a corresponding buffer memory, however.

SUMMARY OF THE INVENTION

It is an objective of the present invention to figure out the above problems.

It is another objective of the present invention to minimize the discard of received data during an overflow of a buffer memory for transferring the received data from a physical layer processor to an ATM layer processor in ATM communication.

It is a further objective of the present invention to provide a communication data receiver and a buffer control method which enable the minimization of impacts of resending.

According to one aspect of the invention, a communication data receiver for storing communication data received from a communication layer into a buffer memory and transferring said communication data to the other communication layer, said communication data receiver comprising:

a cell synchronous means for generating a synchronizing signal and a start detection signal on said received communication cell data synchronized and whose start has been detected;

a write signal generation means for generating a write signal that directs said communication cell data to be written into said buffer memory according to said synchronizing signal and said start detection signal;

a means for holding the write address of the start data of said communication cell data being written;

a means for detecting an overflow of said buffer memory;

a means for inactivating said write signal according to an overflow detection signal; and a means for setting a write address held in said write address hold means as the writing start address for said communication cell data received next according to said overflow detection signal.

In the preferred construction, the communication data receiver further comprises:

a write address generation means for generating a write address on said buffer memory for said communication cell data according to said write signal output from said write signal generation means; and a means for setting a write address held in said write address hold means at said write address generation means as a writing start address for said communication cell data received next according to said overflow detection.

Also, the communication data receiver further comprises:

a write address generation means for generating a write address on said buffer memory for said communication cell data according to said write signal output from said write signal generation means;

wherein said write address hold means composed of a latch circuit for holding a write address of the start data of said communication cell data output from said write address generation means according to a start detection signal of said communication cell data delayed by clock;

said write address generation means loading said write address held in said latch circuit according to said overflow detection signal.

In the preferred construction, the communication data receiver further comprises:

a flip flop for receiving a start detection signal of said communication cell data and outputting said start detection signal delayed by clock;

wherein said latch circuit holds a write address for the start data of said communication cell data output from said write address generation means by said start detection signal delayed by clock output from said flip flop.

Also, the communication data receiver further comprises:

a write address generation means for generating a write address on said buffer memory for said communication cell data according to said write signal output from said write signal generation means; and a read address generation means for generating a read address for use in reading data from said buffer memory;

said overflow detection means including:

an address judgment means for judging whether the value of said write address is identical to the value of said read address;

a first flag for inverting a value every time said write address checks a set of addresses of said buffer memory;

a second flag for inverting a value every time said read address checks a set of addresses of said buffer memory;

a comparison means for comparing said first flag with said second flag; and a means for outputting an overflow signal indicating an overflow of said buffer memory by entering a signal signifying that an address coincidence signal output from said address judgment means is not identical to said first and second flags output from said comparison means.

In the preferred construction, the communication data receiver further comprises:

a write address generation means for generating a write address on said buffer memory for said communication cell data according to said write signal output from said write signal generation means; and a read address generation means for generating a read address for use in reading data from said buffer memory;

said overflow detection means including:

a subtraction means for calculating the difference between said write address and said read address;

a zero detection means for judging whether the value calculated by said subtraction means is zero;

a first flag for inverting a value every time said write address checks a set of addresses of said buffer memory;

a second flag for inverting a value every time said read address checks a set of addresses of said buffer memory;

a comparison means for comparing said first flag with said second flag; and a means for outputting an overflow signal indicating an overflow of said buffer memory by entering a signal signifying that a zero detection signal output from said zero detection means is not identical to said first and second flags output from said comparison means.

In the preferred construction, the write signal generation means is set by the logical product of said synchronizing signal and said start detection signal and composed of a flip flop for outputting a write signal for said buffer memory; and said flip flop is reset by an overflow detection signal output from said overflow detection means to activate said write signal.

According to another aspect of the invention, a communication data receiver for storing communication data received from a communication layer into a buffer memory and transferring said communication data to the other communication layer, said communication data receiver comprising:

a cell synchronous means for a synchronizing signal and a start detection signal for said received communication cell data synchronized and whose start has been detected;

a write signal generation means for generating a write signal directing said communication cell data to be written into said buffer memory according to said synchronizing signal and said start detection signal;

an upper address generation means for generating certain upper bits of a write address on said buffer memory for said communication cell data according to said write signal output from said write signal generation means;

a lower address generation means for generating certain lower bits of a write address on said buffer memory for said communication cell data according to said write signal output from said write signal generation means;

a means for detecting an overflow of said buffer memory;

a means for inactivating said write signal according to said overflow detection signal; and a means for setting an address lower than the current address at said lower address generation means according to said overflow detection signal and for setting a write address composed of an upper address generated by said upper address generation means and a lower address generated by said lower address generation means as a writing start address for said communication cell data received next.

In the preferred construction, the lower address generation means is reset to zero according to said overflow detection signal whereby a write address composed of an upper address generated by said upper address generation means and a lower address generated by said lower address generation means is set as a writing start address for said communication cell data received next.

In the preferred construction, the communication data receiver further comprises:

a first counter constituting said lower address generation means;

said first counter incremented by said read signal;

a second counter constituting said upper address generation means; and a means for checking a value read by said first counter and for resetting said first counter to zero and incrementing said second counter every time the read value coincides with the length of said received cell data.

In the preferred construction, the communication data receiver further comprises:

a read address generation means for generating a read address for use in reading data from said buffer memory; and a third counter incremented by said write signal and decremented by said read signal;

wherein said overflow detection means outputting an overflow detection signal when the value read by said third counter coincides with the maximum address of said buffer memory.

In the preferred construction, the third counter sets the value as the result of subtracting an address value generated by said lower address generation means from the read value coinciding with said maximum address value as a new count start value according to said overflow detection signal.

In the preferred construction, the write signal generation means comprises a flip flop set by the logical product of said synchronizing signal and said start detection signal to output a write signal for said buffer memory; and said flip flop is reset by an overflow detection signal output from said overflow detection means to inactivate said write signal.

According to a still further aspect of the invention, a communication data receiver for storing communication data received from a communication layer into a buffer memory and transferring said communication data to the other communication layer, said communication data receiver comprising:

a means for detecting an overflow of said buffer memory;

a means for prohibiting said communication cell data from being written into said buffer memory according to said overflow detection; and a means for setting a write address lower than the write address for said buffer memory being programmed as a writing start address for said communication cell data received next according to said overflow detection.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 6A provides an illustration which shows the typical operation of write and read addresses and the flag of the buffer memory used in the first preferred embodiment of the present invention;

FIG. 6B provides an illustration which shows the typical operation of write and read addresses and the flag of the buffer memory used in the first preferred embodiment of the present invention;

FIG. 9 provides a timing chart that illustrates the normal operation of the second preferred embodiment of the present invention;

FIG. 10 provides a timing chart that shows the occurrence of an overflow in the buffer memory used in the second preferred embodiment of the present invention;

DESCRIPTION OF THE PREFERRED EMBODIMENTS

Given below is a detailed description of the preferred embodiments of the present invention based on the attached drawings.

Figure 1:
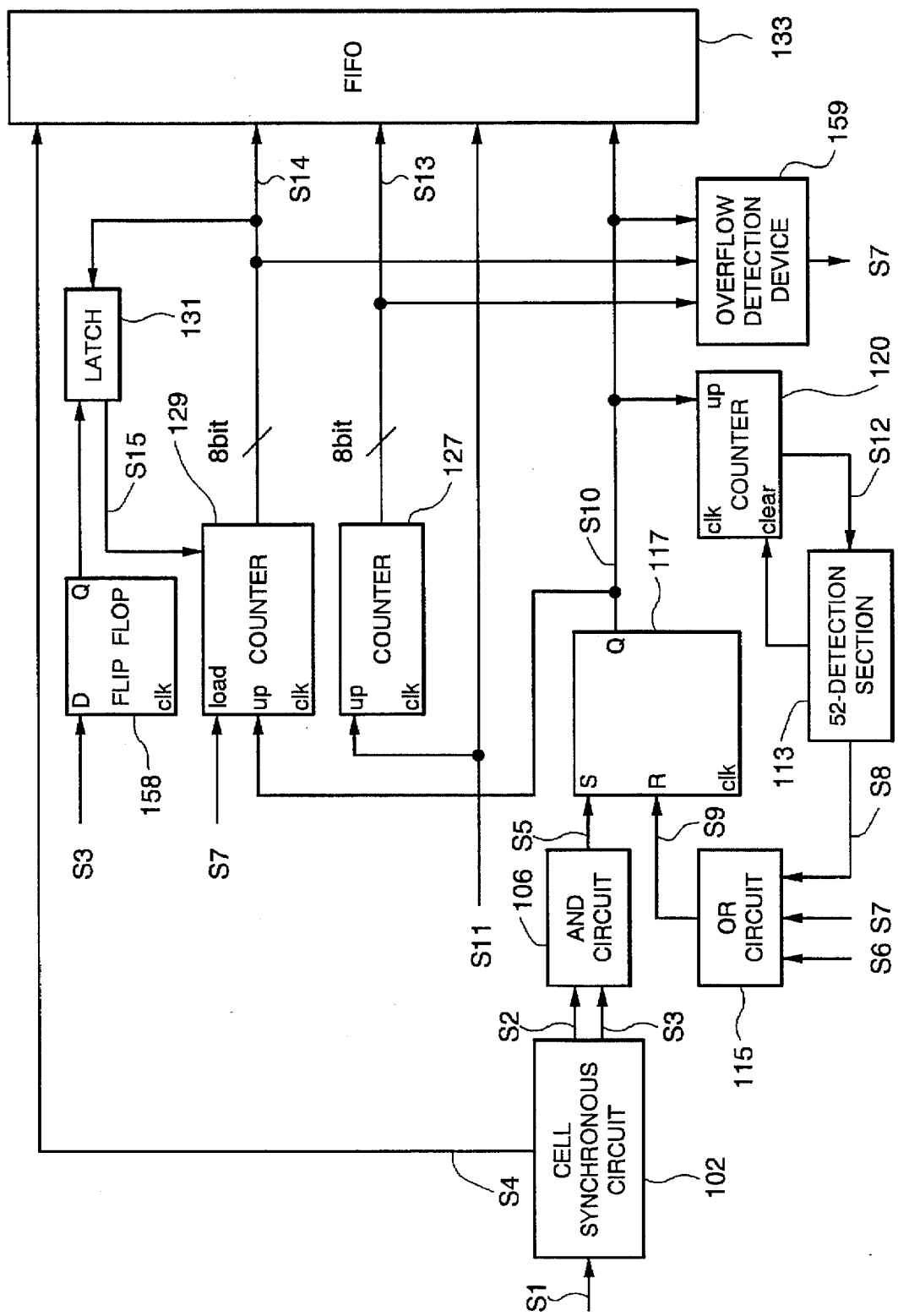
FIG. 1 provides a block diagram that illustrates the configuration of the data receiver based on a first preferred embodiment of the present invention.

FIG. 1 provides the block diagram that illustrates the configuration of the communication data receiver based on the first preferred embodiment of the present invention. The communication data receiver based on the preferred embodiment comprises a cell synchronous circuit 102, an AND circuit 106, a 52-detection section 113, an OR circuit 115, an SR flip flop 117, counters 120, 127 and 129, a latch circuit 131, a FIFO buffer memory 133, a flip flop 158, and an overflow detection device 159.

Received cell data S1 is entered to the cell synchronous circuit 102, with a cell synchronizing signal S2 and a cell start signal S3 generated. Further, the FIFO (first-in first-out) buffer memory 133 is supplied with write data S4.

The cell synchronizing signal S2 and the cell start signal S3 are entered to the AND circuit 106. An output signal S5 from the AND circuit sets the SR flip flop 117. The OR output of a write restart signal for controlling the restart of programming a FIFO buffer memory 57 and the output S5 from the AND circuit may be entered to a set terminal S of the SR flip flop 117.

A write stop signal S6, an overflow detection signal S7, and a 52-detection signal S8 are entered to the OR circuit 115. The SR flip flop 117 is reset by an OR signal S9 output from the OR circuit 115.

The SR flip flop 117 outputs a write signal S10 as the control signal of programming the FIFO buffer memory 133. The counter 120 is incremented by the write signal S10. An output signal S12 from the counter 120 is entered to the 52-detection section 113. The 52-detection section 113 outputs the 52-detection signal S8 when the counter 120 reads a value of "52". The counter 120 is reset by the 52-detection signal S8.

The counter 129 is incremented by the write signal S10. The counter 129 is loaded with hold data S15 as output from the latch circuit 131 by the overflow detection signal S7.

The cell start signal S3 is entered from the flip flop 158 to the latch circuit 131 with a delay of one system clock clk. The cell start signal S3 holds a write address S14 in the latch circuit 131.

The counter 127 is incremented by a read signal S11. Output from the counter 129 becomes the write address of the FIFO buffer memory 133. Output from the counter 127 becomes a read address S13 of the same.

The write address S14, the read address S13, and the write signal S10 are entered to the overflow detection device 159. Upon the detection of an overflow of the FIFO buffer memory 133, the overflow detection device 159 outputs the overflow detection signal S7. In the preferred embodiment, each of the flip flops and counters is operated by the system clock clk.

Figure 2:
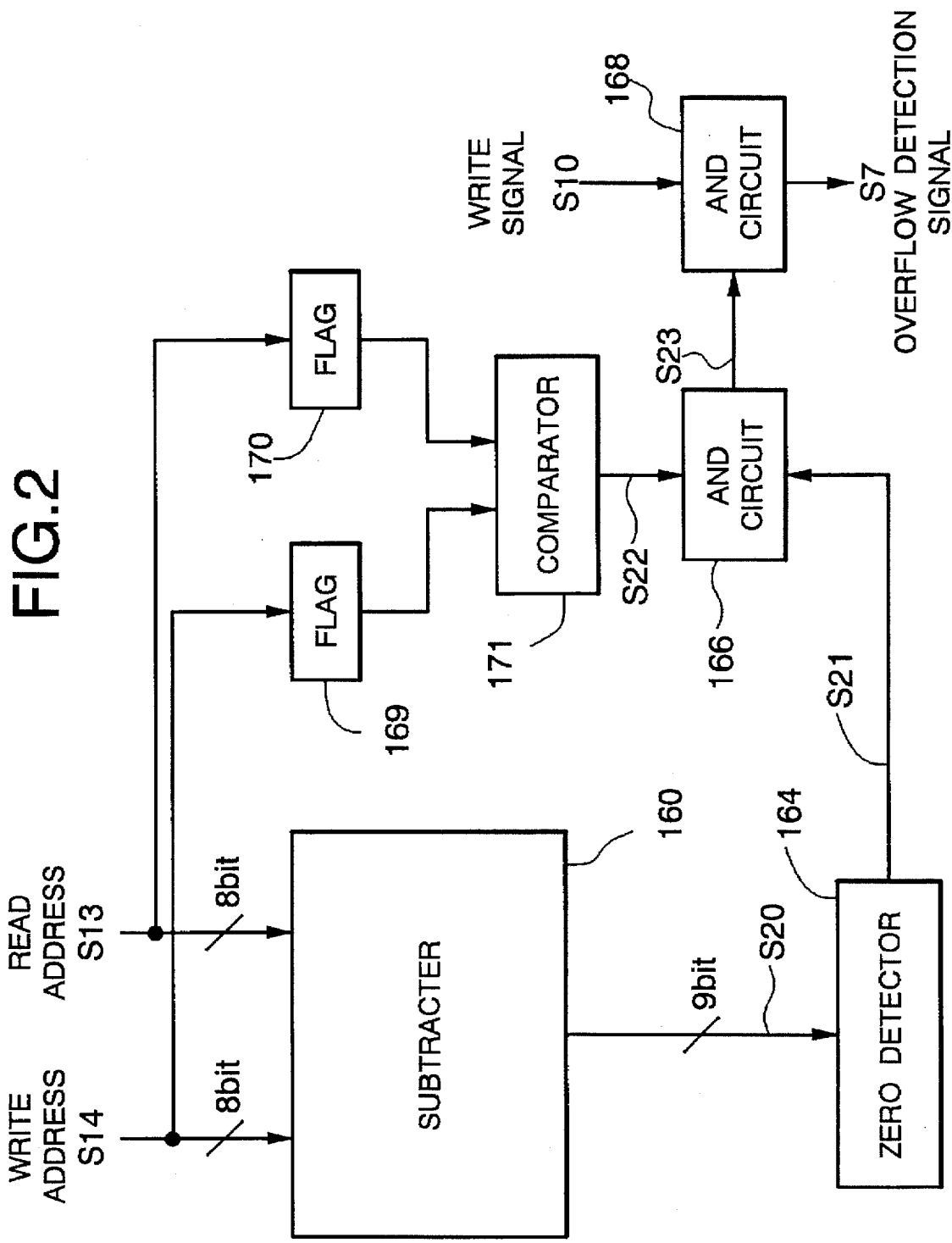
FIG. 2 provides a block diagram that illustrates the typical configuration of an overflow detection section based on FIG. 1.

FIG. 2 provides the block diagram that illustrates the typical configuration of the overflow detection device 159 shown in FIG. 1. As shown therein, the overflow detection device 159 comprises a subtracter 160, a zero detector 164, AND circuits 166 and 168, flags 169 and 170, and a comparator 171.

In FIG. 2, the write address S14 and the read address S13 are entered to the subtracter 160 which in turn issues output S20 as the result of the subtraction of the write address S14 and the read address S13. According to the output S20, the zero detector 164 generates an output signal S21 that indicates whether the result of subtraction by the subtracter 160 is zero.

Further, the flag 169 corresponding to the write address S14 and the flag 170 corresponding to the read address S13 are generated. The comparator 171 compares the flag 169 and the flag 170 with each other, generating a resulting signal S22. If the two input flags 169 and 170 coincide with each other, the comparator 171 outputs a value of "0" as the signal S22. The AND circuit 166 ANDs the output S22 from the comparator 171 and the output S21 from the zero detector 164. The AND circuit 168 ANDs output S23 from the AND circuit 166 and the write signal S10, with the overflow detection signal S7 output.

Figure 3:
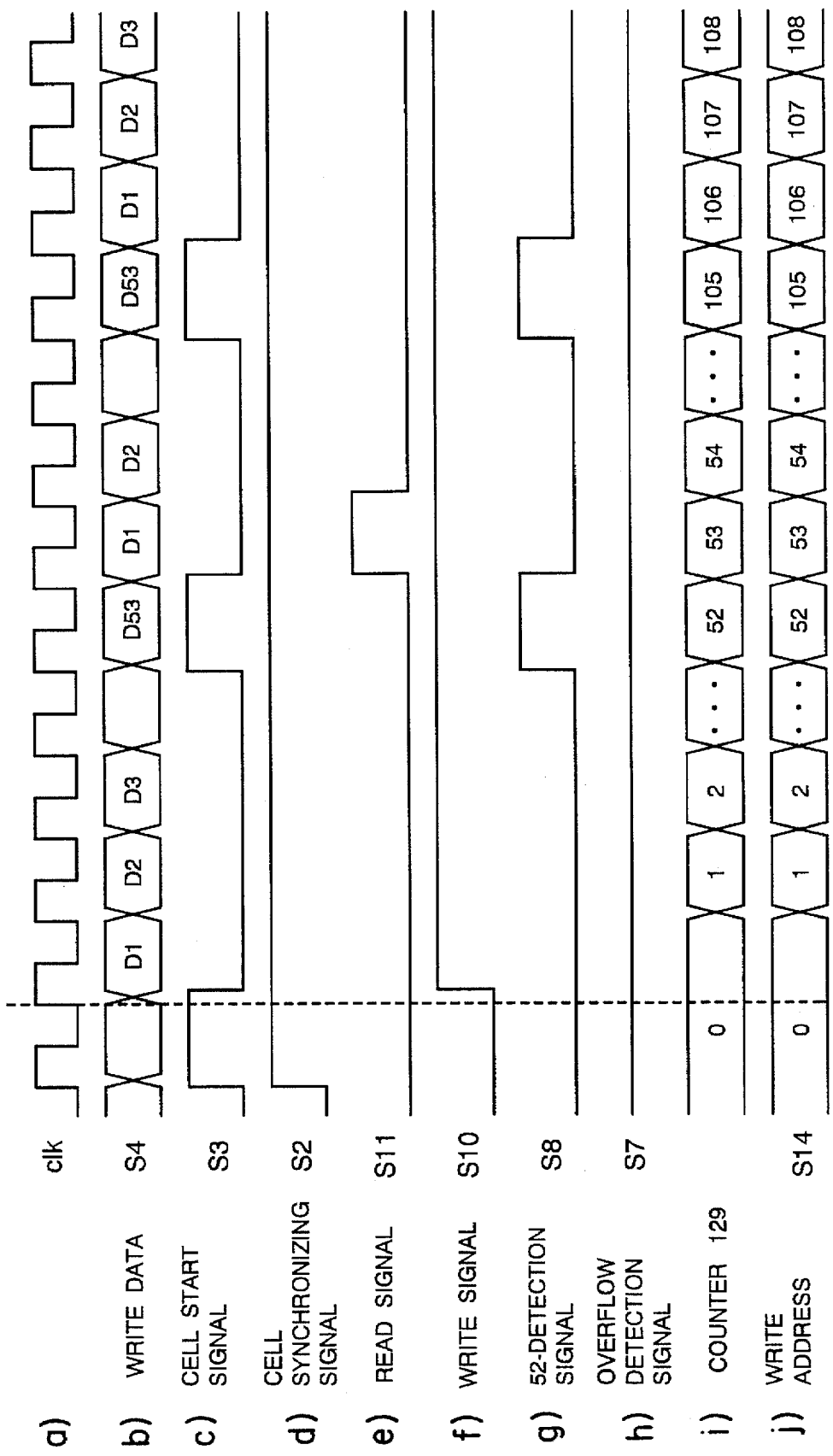
FIG. 3 provides a timing chart that shows the normal operation of the first preferred embodiment of the present invention.
Figure 4:
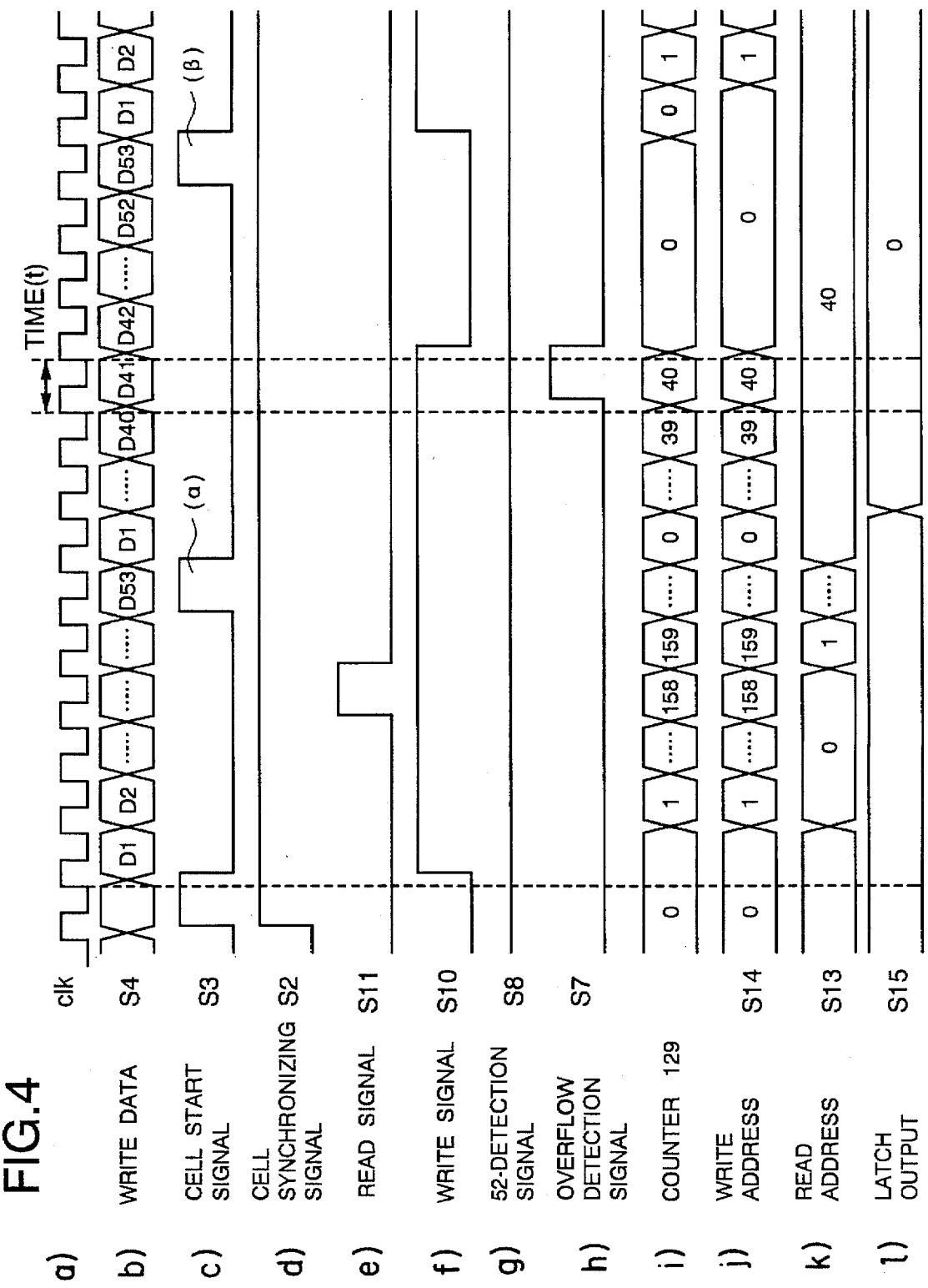
FIG. 4 provides a timing chart that shows the occurrence of an overflow in the buffer memory used in the first preferred embodiment of the present invention.
Figure 5:
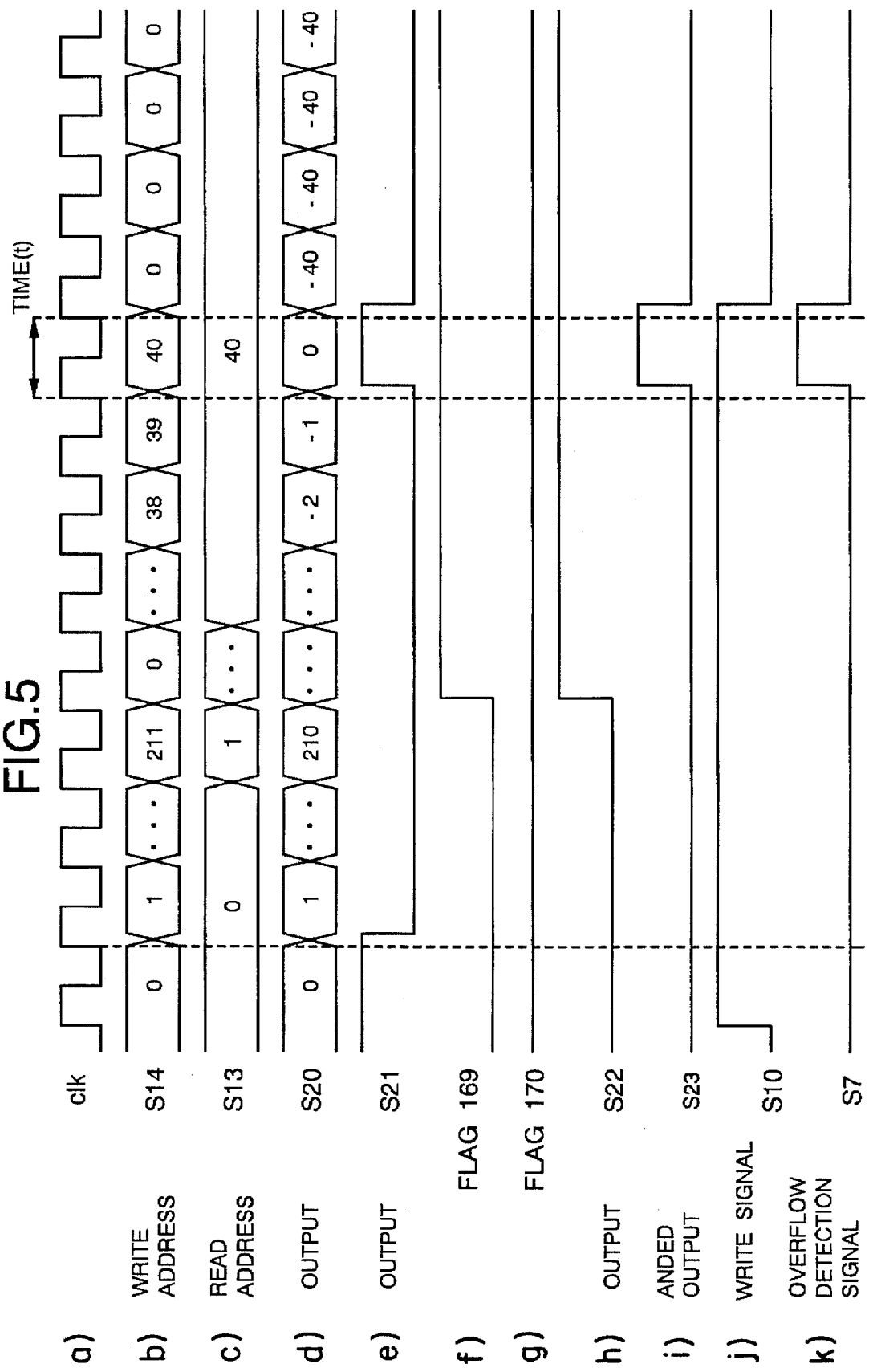
FIG. 5 provides a timing chart that illustrates the operation of the overflow detection section in the first preferred embodiment of the present invention.

FIG. 3 provides the timing chart that shows the normal operation of the first preferred embodiment of the present invention. FIG. 4 provides the timing chart that shows the abnormal operation of the first preferred embodiment of the present invention. The abnormal operation means the occurrence of an overflow in the buffer memory. FIG. 5 provides the timing chart that illustrates the operation of the overflow detection device 159 used in the first preferred embodiment of the present invention.

FIG. 6 shows the operation of the write and read addresses and the flags of the FIFO buffer memory 133 used in the first preferred embodiment of the present invention. FIG. 7 provides an illustration that shows the state of the FIFO buffer memory when it overflows.

Figure 15:
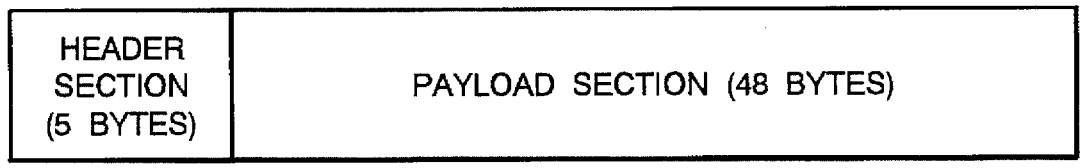
FIG. 15 shows the configuration of an ATM cell.
Figure 16:
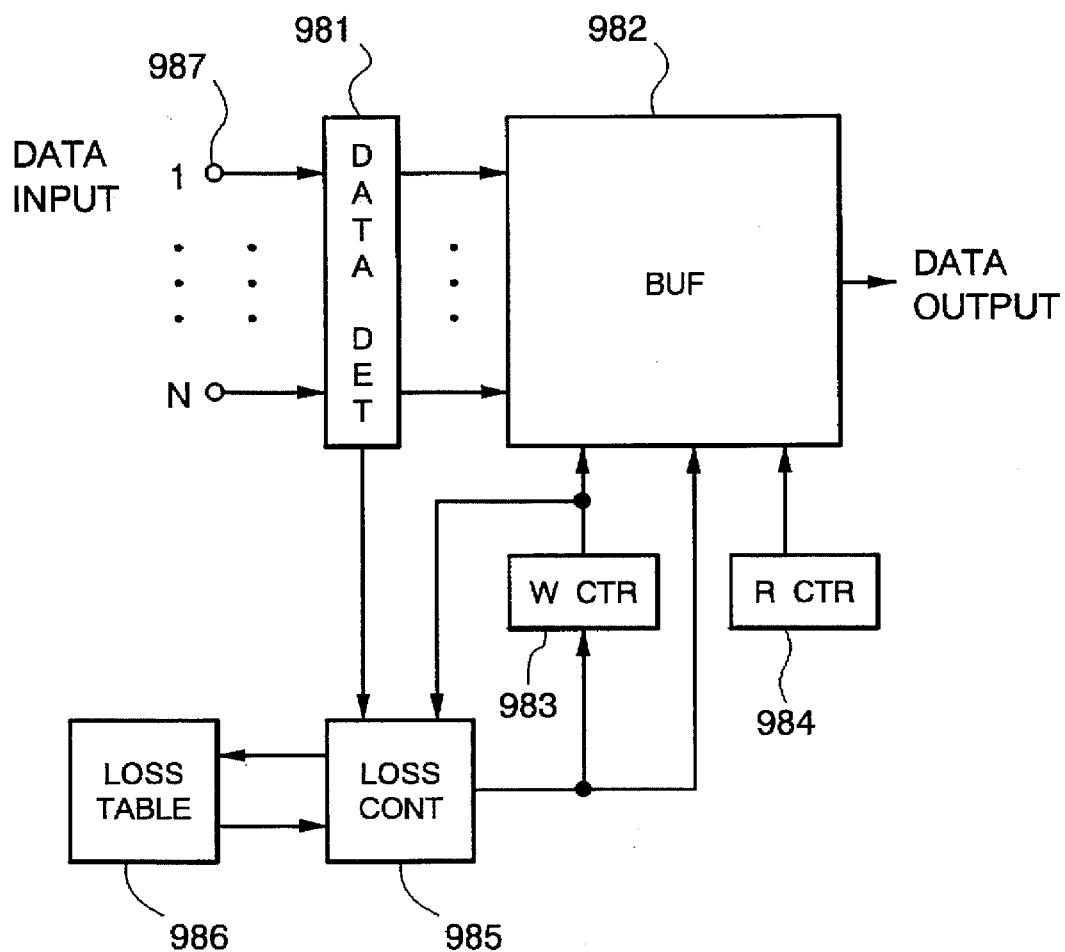
FIG. 16 provides a block diagram that illustrates the method of discarding input data overloaded in the conventional communication data receiver.

First, FIGS. 1, 3 and 15 are used to explain the normal operation of the data receiver based on the first preferred embodiment of the present invention. The received data S1 is composed of ATM cells. As shown in FIG. 15, the ATM cell is composed of a total of 53 bytes, 5 bytes of a header section and 48 bytes of payload section.

The cell synchronous circuit 102 applies CRC operation to five bytes of received data S1. If the result of the CRC operation is "0", the cell synchronous circuit 102 identifies the five bytes as five bytes of an ATM cell header. The cell synchronizing signal S2, the cell start signal S3, and the write data S4 are generated in the timing shown in FIG. 3. The cell synchronizing signal S2 can also be generated when a series of cells of the cell start signal is detected.

When the cell synchronizing signal S2 and the cell start signal S3 become active, the output signal S5 from the OR circuit 106 becomes active, with the SR flip flop 117 set. Thus, the write signal S10 becomes active.

With the write signal S10 active, the counter 120 is incremented by a rise in the system clock clk. The counter 120 is reset by the 52-detection signal S8 when it reads a value of "52". The 52-detection signal S8 is output via the OR circuit 115 as the output signal S9, which in turn resets the SR flip flop 117. When 53 bytes of the write data S4 are written, the 52-detection signal S9 attempts to inactivate the write signal S10.

In the preferred embodiment shown in FIG. 3, the cell start signal S3 becomes active in the same timing as the 52-detection signal S8. As the output signal S5 as the result of the logical product of the cell start signal S3 and the cell synchronizing signal S2 is active and the SR flip flop 117 is set initially, the write signal S10 is held active. This is because the received cell data S1 is entered consecutively. As shown in FIG. 1, the write signal S10 is reset by the write stop signal S6 as well.

The write address S14 of the FIFO buffer memory 133 is given by the counter 129. The write address S14 is incremented by the counter 129 on a rise in the system clock clk when the write signal S10 is active. The read address S13 is given by the counter 127. The read address S13 is incremented by the counter 127 on a rise in the system clock clk when the read signal S11 is active.

The overflow detection device 159 detects an overflow of the FIFO buffer memory by the write address S14, the read address S13 and the write signal S10.

The following explains the operation of the overflow detection device 159. The subtraction of the write address S14 and the read address S13 is executed in the subtracter 160. FIG. 5 illustrates the relationship between the write address S14, the read address S13 and the output S20 of the subtracter. In the preferred embodiment shown in FIG. 5, the subtracter 160 subtracts the read address S13 from the write address S14. When the output S20 from the subtracter 160 is "0", the zero detector 164 detects this value, with the output S21 activated.

Each of the flag 169 corresponding to the write address S14 and the flag 170 corresponding to the read address S13 is set initially at "0". When each of the write address S14 and the read address S13 is incremented to an address value of "211" and, then, returned to "0", the values of the corresponding flags 169 and 170 are inverted.

FIG. 6A shows the state of the FIFO buffer memory 133 when the flag 169 coincides with the flag 170. In FIG. 6A, the part indicated by oblique lines refers to the data stored in the FIFO buffer memory 133. The coincidence of the write address S14 with the read address S13 indicates that the FIFO buffer memory 133 stores no data. In FIG. 6A, the flag 169 and the flag 170 coincide with each other. Thus, the output S22 of the comparator 171 is "0". This means that the output S23 from the AND circuit 166 in FIG. 2 becomes 0 and the resulting overflow detection signal S7 becomes "0". Therefore, an overflow of the FIFO buffer memory 133 is not detected.

In FIG. 6B, the flag 169 corresponding to the write address S14 is inverted, being "1". In FIG. 6B, the part indicated by oblique lines refers to the data stored in the FIFO buffer memory 133. Thus, the coincidence of the write address S14 with the read address S13 indicates that the FIFO buffer memory 133 is filled with data. With the FIFO buffer memory filled with data, the output S21 from the zero detector 164 is "1" and the output S22 from the comparator 171 is "1". Hence, the output S23 from the AND circuit 166 becomes "1". When the write signal S10 becomes "1", the overflow detection signal S7 as output from the AND circuit 168 becomes "1", with an overflow detected.

Next, FIGS. 1, 2, 4, 5, 6 and 7 are used to explain the operation of the data receiver based on the first preferred embodiment during an overflow.

Figure 7A:
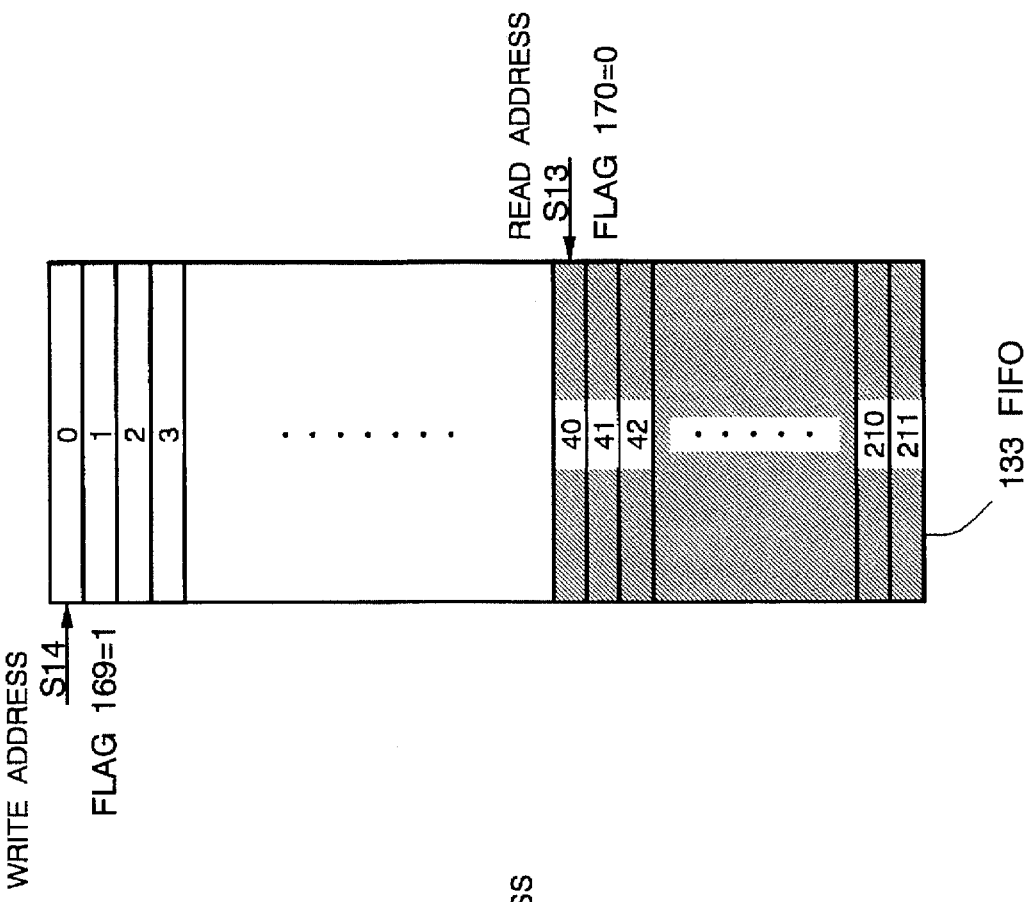
FIG. 7A provides an illustration which shows a state of the FIFO buffer memory used in the first preferred embodiment of the present invention when it overflows.

It is assumed that the size of the FIFO buffer memory 133 is four cells (=212 bytes) and that data is written into and read from the FIFO buffer memory in the same manner as for the above normal operation. As shown in time (t) in FIGS. 4 and 5, the overflow detection signal S7 is generated the write signal S10 becomes "1 with the FIFO buffer memory 133 filled with data. FIG. 7A shows the state of the FIFO buffer memory when the overflow detection signal S7 is generated. Both of the write address S14 and the read address S13 indicate an address value of "40".

Therefore, the SR flip flop 117 is reset and the write signal S10 is inactivated, resulting in the stop of writing into the FIFO buffer memory 133.

The write address S14 is latched by the latch circuit 131 according to the cell start signal S3 ((alpha) in FIG. 4) delayed by the flip flop 158 by system clock clk. Thus, the hold data S15 in the latch circuit 131 is "0". As shown in FIG. 4, the write address value of cell start data during writing is "0" when the overflow detection signal S7 becomes active.

Figure 7B:
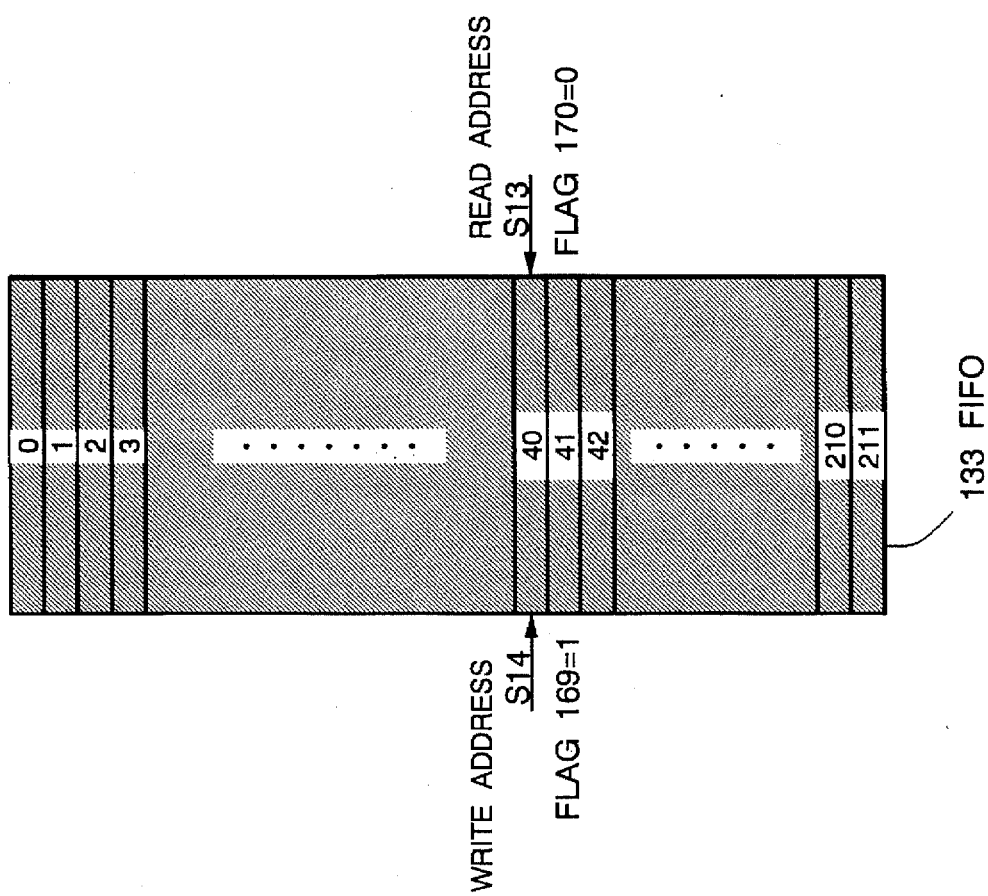
FIG. 7B provides an illustration which shows a state of the FIFO buffer memory used in the first preferred embodiment of the present invention after it has overflowed.

The counter 129 is loaded by the overflow detection signal S7 with the hold data S15 (=0) as output from the latch circuit 131 on a rise in the system clock clk, with a value of "0" output as the write address S14. FIG. 7B shows the state of the FIFO buffer memory 133. As shown in FIG. 7B, the FIFO buffer memory is provided with an empty area of 40 bytes.

Upon the detection of the cell start on the received data S1 by the cell synchronous circuit 102 in the timing (beta) in FIG. 4, the cell start signal S3 and the output S5 from the AND circuit 106 become "1". Thus, the SR flip flop 117 is set, with the write signal S10 becoming "1". This means that cell writing is restarted from the address value (=0) given by the write address S14.

Discarding cells being written during the occurrence of an overflow enables the FIFO buffer memory 133 to be programmed with the received latest cells. The following description based on drawings deals with the data receiver used in the second preferred embodiment of the present invention. The data receiver used in the second preferred embodiment comprises a cell synchronous circuit 202, an AND circuit 206, a 52-detection section 234, an OR circuit 236, an SR flip flop 238, counters 240, 244, 246 and 248, an overflow detection device 242, an OR circuit 250, a FIFO buffer memory, and a subtracter 275.

Figure 8:
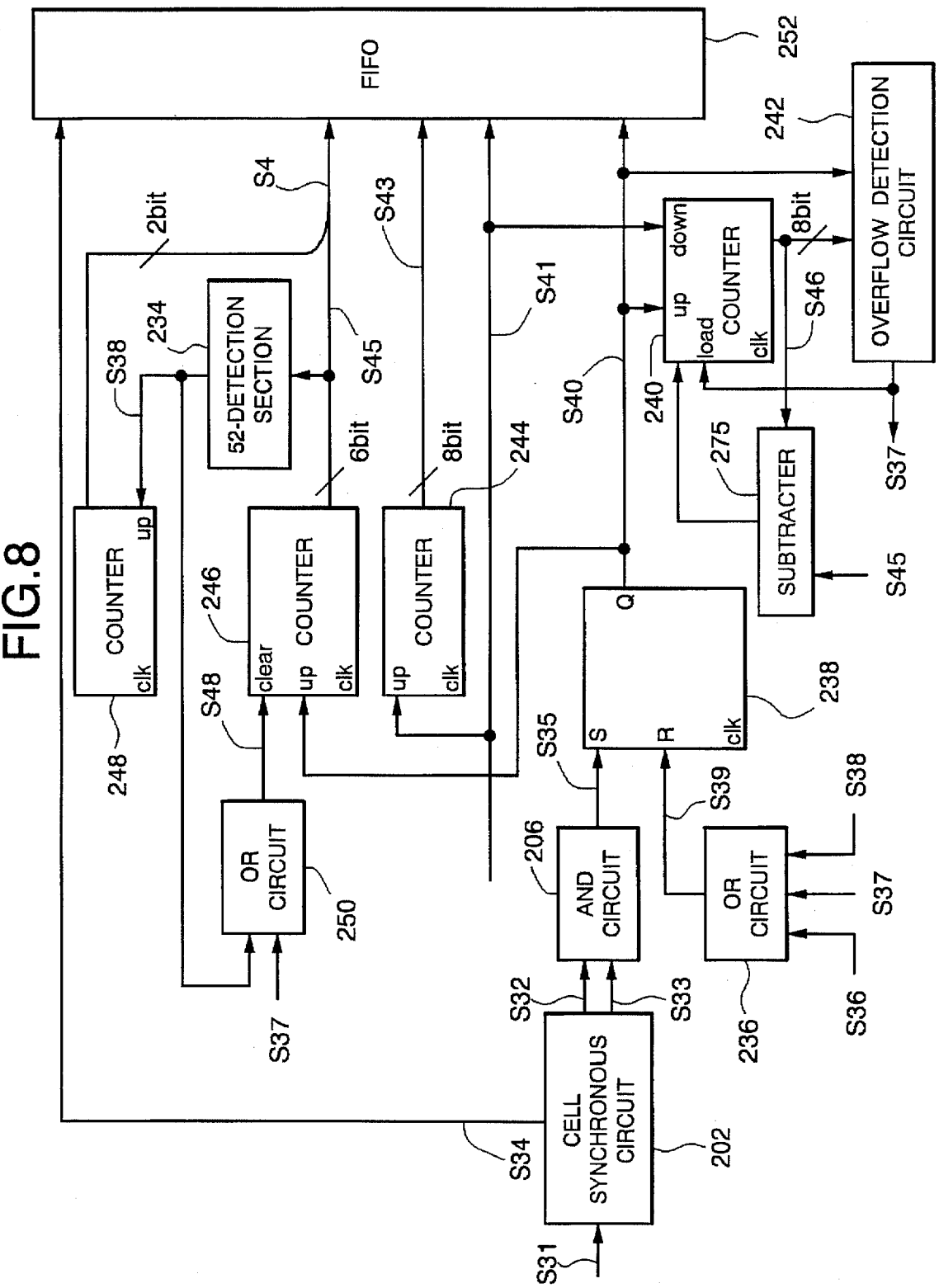
FIG. 8 provides a block diagram that illustrates the configuration of the data receiver based on a second preferred embodiment of the present invention.

In FIG. 8, received cell data S31 is entered to the cell synchronous circuit 202, which in turn generates a cell synchronizing signal S32 and a cell start signal S33. Also, the FIFO buffer memory 252 is supplied with write data S34. The cell synchronizing signal S32 and the cell start signal S33 are entered to the AND circuit 206. An output signal S35 from the AND circuit 206 sets the SR flip flop 238. The OR output of a write restart signal for controlling the restart of programming a FIFO buffer memory 257 and the output S35 from the AND circuit 206 may be entered to a set terminal S of the SR flip flop 238.

A write stop signal S36, an overflow detection signal S37, and a 52-detection signal S38 are entered to the OR circuit 236. The SR flip flop 238 is reset by an output signal S39 from the OR circuit 236. The SR flip flop 238 outputs a write signal S40 as the FIFO buffer memory 252 programming control signal.

Output S45 from the counter 246 constitutes the lower six bits of a write address S44. The counter 246 is incremented by the write signal S40 and reset to "0" by an output signal S48 from the OR circuit 250 that receives the overflow detection signal S37 and the 52-detection signal S38.

The 52-detection section 234 generates the 52-detection signal S38 when the output S45 from the counter 246 becomes a value of "52". Output from the counter 248 constitutes the upper two bits of the write address S44. The counter 248 is incremented by the 52-detection signal S38. Output from the counters 248 and 246 provides the write address S44 for the FIFO buffer memory 252. The counter 244 is incremented by a read signal S41. The counter 244 outputs a read address S43 for the FIFO buffer memory 252.

The counter 240 is incremented by the write signal S40 and decremented by the read signal S41. The counter 240 is loaded by the overflow detection signal S37 with the result of the subtraction of an output signal S46 from the counter 240 and the output value S45 from the counter 246.

The overflow detection section 242 receives the output signal S46 from the counter 240 to generate the overflow detection signal S43. The subtracter 275 subtracts the output signal S46 and the output S45 from the counter 246. In the second preferred embodiment, the flip flops and the counters are operated by a system clock clk.

FIG. 9 provides the timing chart that illustrates the normal operation of the data receiver based on the second preferred embodiment of the present invention. FIG. 10 provides the timing chart that illustrates the abnormal operation of the data receiver based on the second preferred embodiment of the present invention when the buffer memory overflows.

FIG. 11 provides the illustration which shows the state of the FIFO buffer memory 252 built in the data receiver used in the second preferred embodiment of the present invention when it overflows.

First, FIGS. 8, 9 and 15 are used to explain the normal operation of the data receiver based on the second preferred embodiment of the present invention. The received data S31 is composed of ATM cells. As shown in FIG. 15, the ATM cell is made up of a total or 53 bytes, five bytes of a header section and 48 bytes of payload section.

The cell synchronous circuit 202 applies CRC operation to five bytes of received data S31. If the result of the operation is "0", the five bytes are identified as five bytes of the header of an ATM cell. Also, the cell synchronizing signal S32, the cell start signal S33, and the write data S34 are generated in the timing shown in FIG. 9. The cell synchronizing signal S32 can also be generated when a series of cells of the cell start signal S33 is detected.

When the cell synchronizing signal S32 and the cell start signal S33 become active, the output signal S35 from the OR circuit 206 becomes active, with the SR flip flop 238 set. Thus, the write signal S40 becomes active.

The counter 246 is incremented by a rise in the system clock clk when the write signal S40 is active. When the output S45 from the counter 246 becomes a value of "52", the 52-detection signal S38 is developed from the 52-detection signal 234.

The counter 248 is incremented by a rise in the system clock clk when the 52-detection signal S38 is active. The write address S44 for the FIFO buffer memory 252 is given by eight-bit data where output from the counter 248 is the upper two bits and the output S45 from the counter 246 is the lower six bits.

For example, as shown in FIG. 9, when the counter 248 reads a value of "0" (a binary number of "00") and the counter 246 reads a value of "52" (a binary number of "110100"), the value of the write address S44 is "52" (a binary number of "00110100"). Further, when the counter 248 reads a value of "1" (a binary number of "01") and the counter 246 reads a value of "52" (a binary number of "110100"), the value of the write address S44 is "116" (a binary number of "01110100"). Furthermore, for example, if the counter 248 reads a value of "2" ("10") and the counter 246 reads a value of "2" ("000010"), the value of the write address S44 is "130" ("10000010").

The 52-detection signal S38 resets the SR flip flop 238 via the OR circuit 236. As soon as 53 bytes of write data S34 are written, the 52-detection signal S38 attempts to inactivate the write signal S40.

In the preferred embodiment, as shown in FIG. 9, the cell start signal S33 becomes active in the same timing as the 52-detection signal S38. This activates the output signal S35 as the logical product of the cell start signal S33 and the cell synchronizing signal S32. As the SR flip flop 238 is set initially, the write signal S40 is held active. This is because a series of ATM cells is entered. The write signal S40 can also be reset by the write stop signal S36.

The following describes the counter 240 which controls data stored in the FIFO buffer memory 252. The counter 240 is incremented by a rise in the system clock clk when the write signal S40 is active. The counter 240 is decremented by a rise in the system clock clk when the read signal S41 is active. As shown in FIG. 9, the value of the counter 240 ("53") is held when the read signal S41 and the write signal S40 are activated at a time.

Next, FIGS. 8 and 10 are used to explain the operation of the data receiver based on the second preferred embodiment of the present invention when the FIFO buffer memory overflows.

Figure 11B:
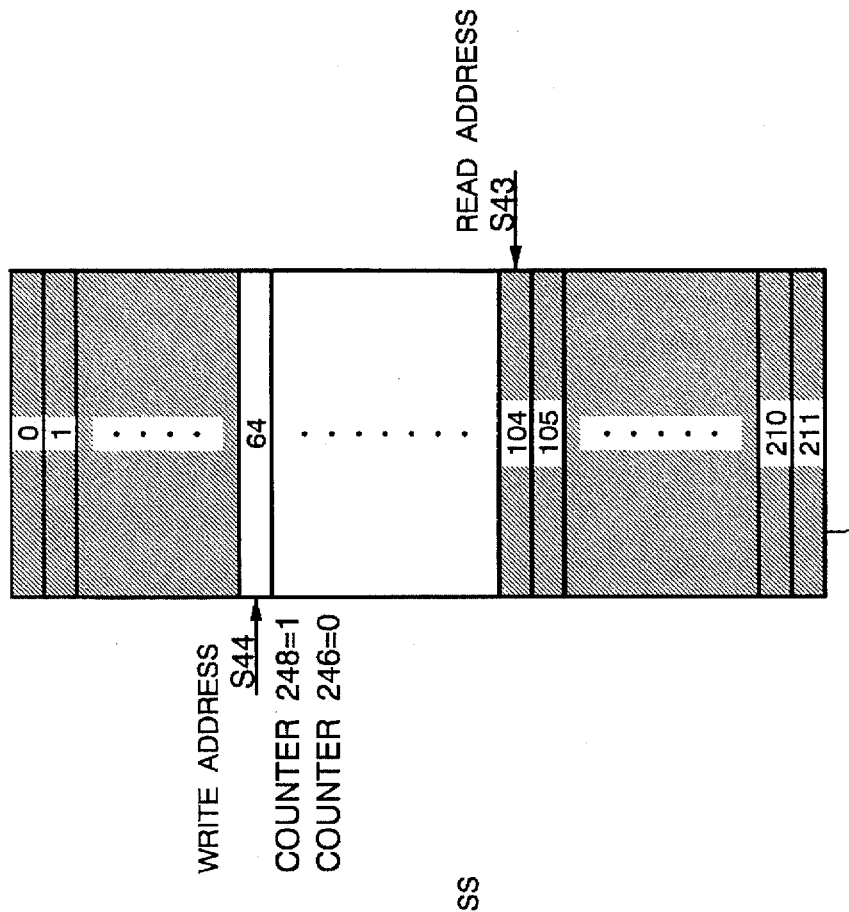
FIG. 11B provides an illustration which shows a state of the FIFO buffer memory used in the second preferred embodiment of the present invention after it overflowed.
Figure 11A:
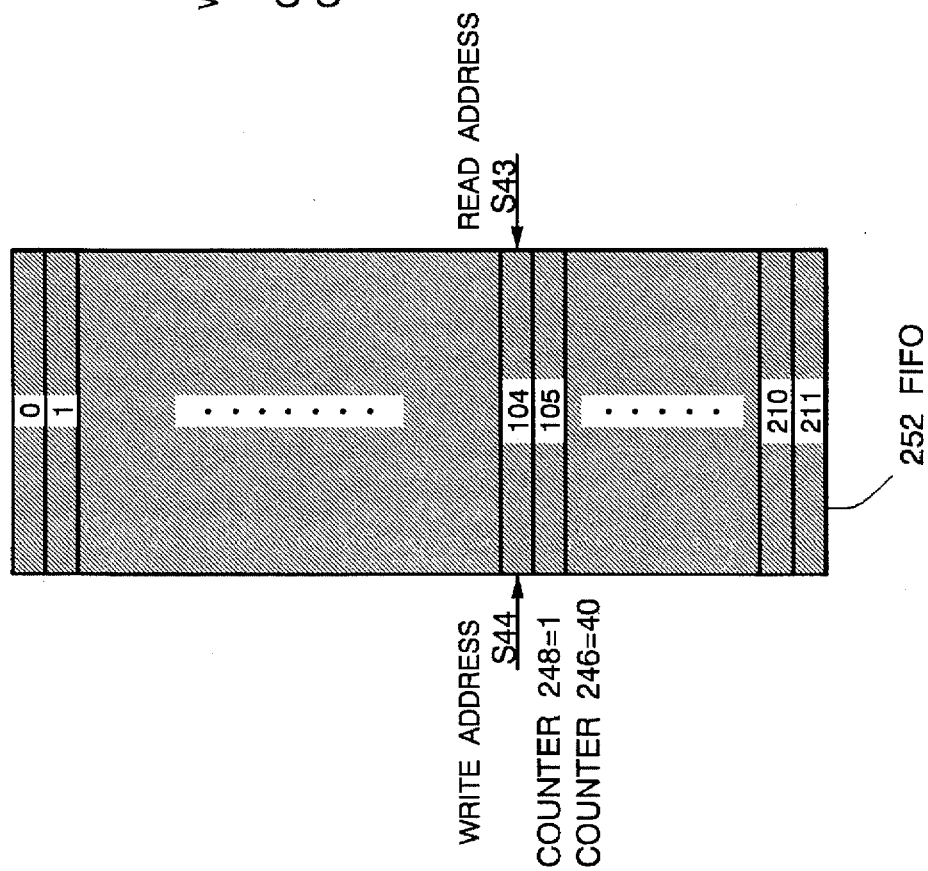
FIG. 11A provides an illustration which shows a state of the FIFO buffer memory used in the second preferred embodiment of the present invention when it overflows.
Figure 12:
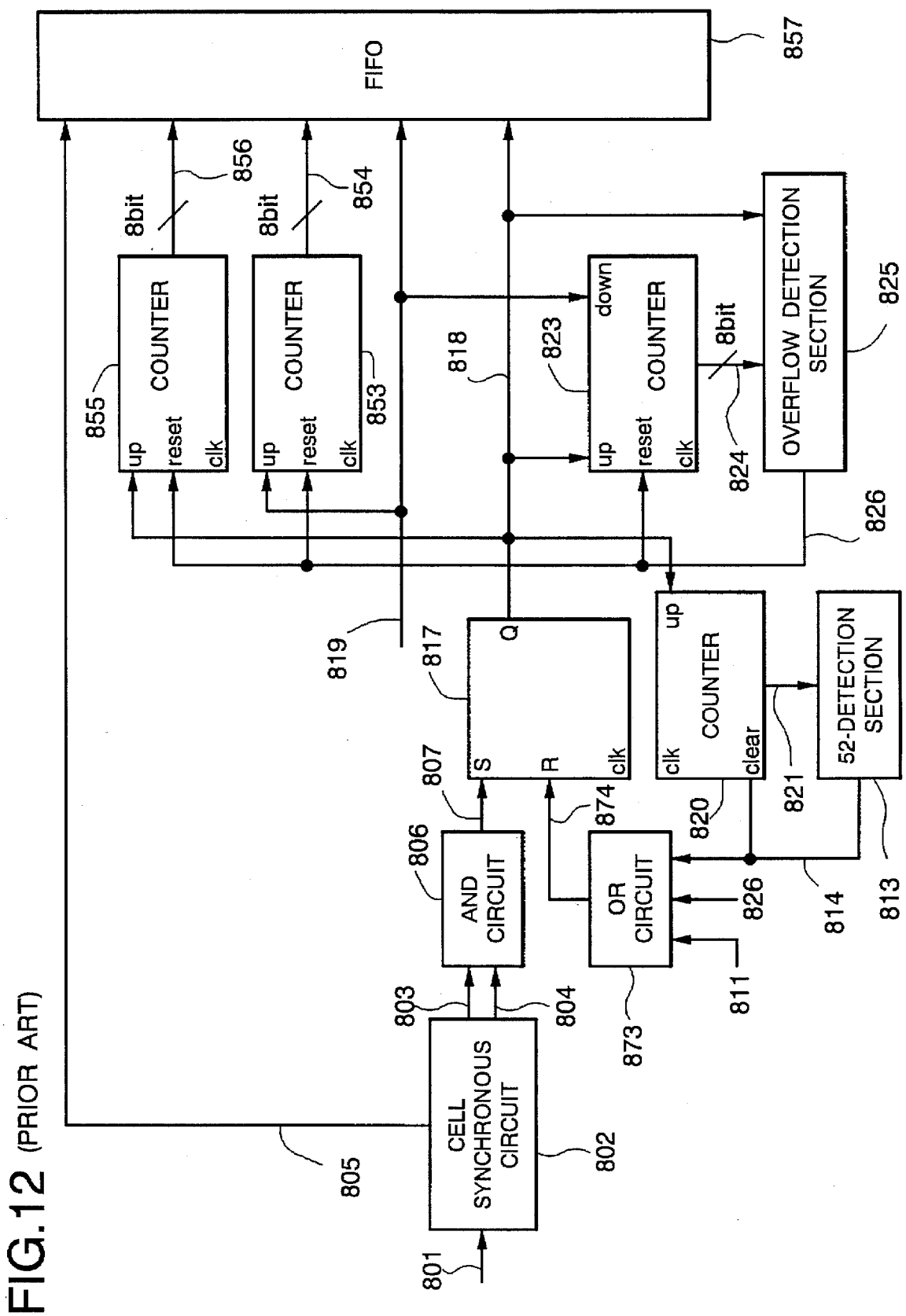
FIG. 12 provides a block diagram that illustrates the typical configuration of the conventional communication data receiver.
Figure 13:
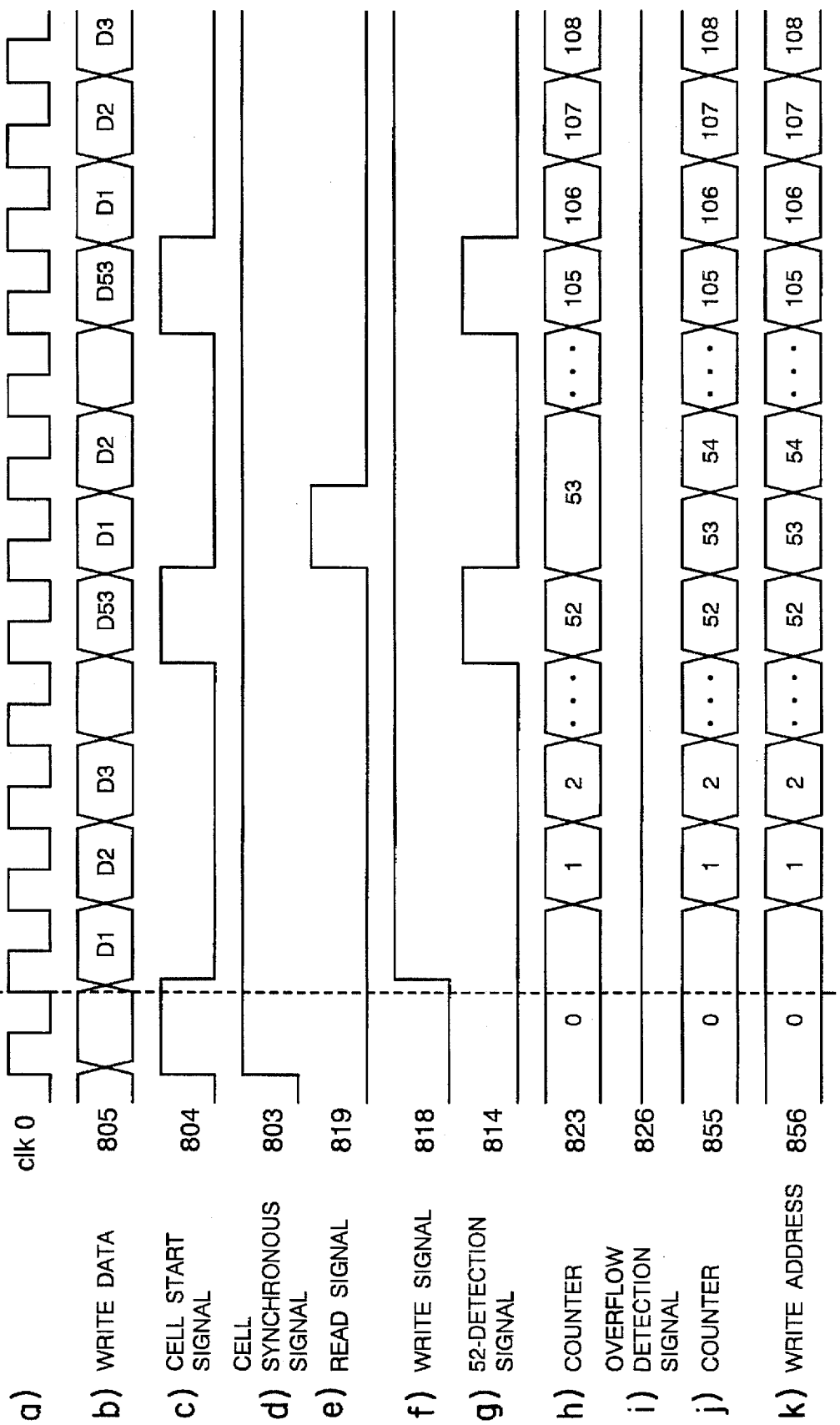
FIG. 13 provides a timing chart that illustrates the normal operation of the conventional communication data receiver shown in FIG. 12.
Figure 14:
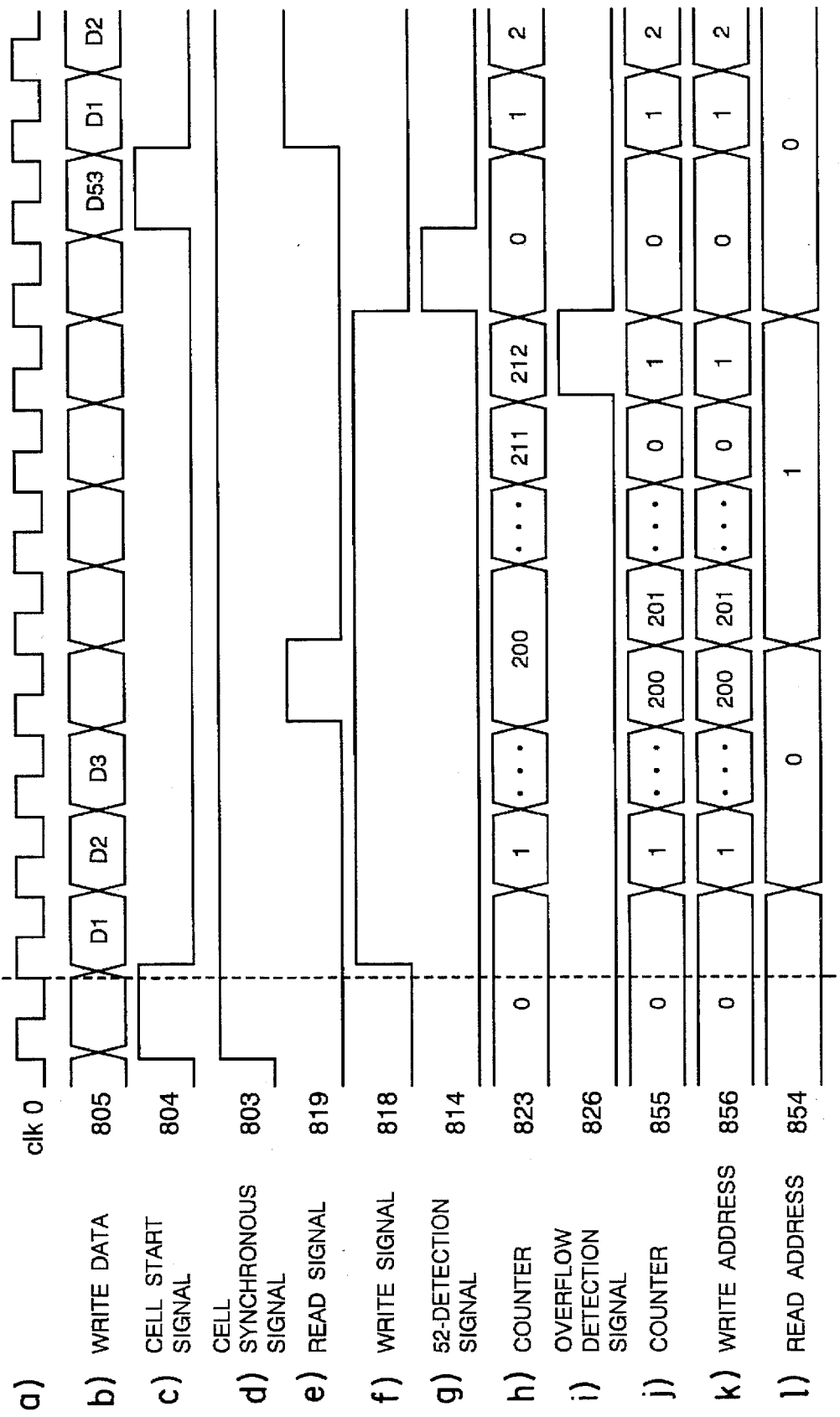
FIG. 14 provides a timing chart that illustrates the abnormal operation of the conventional communication data receiver shown in FIG. 12.

It is assumed that the size of the FIFO buffer memory 252 is four cells (=212 bytes) and that data is written into and read from the FIFO buffer memory 252 in the same manner as for the above normal operation. As shown in FIG. 10, the overflow detection signal S37 is generated when the write signal S40 becomes a value of "1" with the FIFO buffer memory 252 filled with data (the counter 240 reading a value of "212"). FIG. 11A shows the state of the FIFO buffer memory 252. In the preferred embodiment shown in FIG. 10, with the overflow detection signal S37 active, the value of the write address S44 is "104", the counter 246 serving the lower six bits reads an S45 output value of "40", and the counter 248 serving the upper bits reads a value of "1".

When the overflow detection signal S37 is activated, the SR flip flop 238 is reset, with the write signal S40 inactivated. Thus, writing into the FIFO buffer memory 252 is stopped.

On the other hand, the counter 246 is reset to "0" by the overflow detection signal S37 on a rise in the system clock clk. FIG. 11B shows the state of the FIFO buffer memory 252, where the value of the write address S44 is "64".

The counter 240 is loaded with output from the subtracter 275. The subtracter 275 outputs a value of "172" that is the result of the subtraction of the output value of the counter 246 (="40") from the output signal S46 of the counter 240 (="212"). Hence, the FIFO buffer memory 252 is provided with an empty area of 40 bytes.

Upon the detection of the start of a cell of received data S31 by the cell synchronous circuit 202, the cell start signal S33 and the output signal S35 from the AND circuit 206 become "1". Thus, the SR flip flop 238 is set, with the write signal S40 becoming "1". The result is that writing is restarted from the address indicated by the write address S44 (="64"). Discarding cells being written during the occurrence of an overflow enables the received latest cell to be written into the FIFO buffer memory 252.

As set out above, the data receiver of the present invention updates the write address of the FIFO buffer memory when it overflows, and the write address when the received start cell data is written. This allows the discard of only the cell data being written during the occurrence of an overflow. Therefore, the FIFO buffer memory is so provided with an empty area that it may be programmed with the latest received data. The result is that received data discarded during an overflow can be minimized and that impacts of resending can be curbed most significantly.

Further, when the FIFO buffer memory overflows, the next received cell data is written from the write address of the received start cell data where the overflow has been detected. In addition, only the cell data being written during the occurrence of the overflow is discarded. Thus, the discard of received data during the occurrence of an overflow is so minimized that the latest received cell data may be written into the buffer memory. This enables the most significant suppression of impacts of resending. Furthermore, the data receiver of the present invention comprises a means for storing the write address of the received start cell data being written and a means for updating the write address according to the value of the above means when the buffer memory overflows. Both the means allow the minimization of the discard of received data during the occurrence of an overflow.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A communication data receiver for storing communication cell data received from a communication layer into a buffer memory and transferring said communication cell data to another communication layer, said communication data receiver comprising:

a cell synchronous means for generating a synchronizing signal and a start detection signal when said received communication cell data is synchronized and a start of said received communication cell data has been detected;

a write signal generation means for generating a write signal that directs said communication cell data to be written into said buffer memory according to said synchronizing signal and said start detection signal;

a means for holding a write address of a start data of said communication cell data being written;

a means for detecting an overflow of said buffer memory;

a means for inactivating said write signal according to an overflow detection signal output by said overflow detection means; and a means for setting the write address held in said write address holding means as a writing start address for said communication cell data received next according to said overflow detection signal.

2. A communication data receiver as set forth in claim 1, which further comprises:

a write address generation means for generating the write address on said buffer memory for said communication cell data according to said write signal output from said write signal generation means; and a means for setting the write address held in said write address holding means at said write address generation means as the writing start address for said communication cell data received next according to said overflow detection.

3. A communication data receiver as set forth in claim 1, which further comprises:

a write address generation means for generating the write address on said buffer memory for said communication cell data according to said write signal output from said write signal generation means;

wherein said write address holding means includes a latch circuit for holding the write address of the start data of said communication cell data output from said write address generation means according to the start detection signal of said communication cell data delayed by one clock period;

said write address generation means loading said write address held in said latch circuit according to said overflow detection signal.

4. A communication data receiver as set forth in claim 3, which further comprises:

a flip flop for receiving the start detection signal of said communication cell data and outputting said start detection signal delayed by one clock period;

wherein said latch circuit holds the write address for the start data of said communication cell data output from said write address generation means by said start detection signal delayed by one clock output from said flip flop.

5. A communication data receiver as set forth in claim 1, which further comprises:

a write address generation means for generating the write address on said buffer memory for said communication cell data according to said write signal output from said write signal generation means; and a read address generation means for generating a read address for use in reading data from said buffer memory;

said overflow detection means including:

an address judgment means for judging whether a value of said write address is identical to value of said read address;

a first flag for inverting a value every time said write address checks a set of addresses of said buffer memory;

a second flag for inverting a value every time said read address checks a set of addresses of said buffer memory;

a comparison means for comparing said first flag with said second flag; and a means for outputting an overflow signal indicating an overflow of said buffer memory by entering a signal signifying that an address coincidence signal output from said address judgment means is not identical to said first and second flags from said comparison means.

6. A communication data receiver as set forth in claim 1, which further comprises:

a write address generation means for generating a write address on said buffer memory for said communication cell data according to said write signal output from said write signal generation means; and a read address generation means for generating a read address for use in reading data from said buffer memory;

said overflow detection means including:

a subtraction means for calculating the difference between said write address and said read address;

a zero detection means for judging whether the value calculated by said subtraction means is zero;

a first flag for inverting a value every time said write address checks a set of addresses of said buffer memory;

a second flag for inverting a value every time said read address checks a set of addresses of said buffer memory;

a comparison means for comparing said first flag with said second flag; and a means for outputting an overflow signal indicating an overflow of said buffer memory by entering a signal signifying that a zero detection signal output from said zero detection means is not identical to said first and second flags output from said comparison means.

7. A communication data receiver as set forth in claim 1, wherein said write signal generation means is set by a logical product of said synchronizing signal and said start detection signal and includes a flip flop for outputting the write signal for said buffer memory;

said flip flop is reset by said overflow detection signal output from said overflow detection means to activate said write signal.

8. A communication data receiver for storing communication cell data received from a communication layer into a buffer memory and transferring said communication cell data to another communication layer, said communication data receiver comprising:

a cell synchronous means for generating a synchronizing signal and a start detection signal when said received communication cell data is synchronized and a start of said received communication cell data has been detected;

a write signal generation means for generating a write signal directing said communication cell data to be written into said buffer memory according to said synchronizing signal and said start detection signal;

an upper address generation means for generating certain upper bits of a write address on said buffer memory for said communication cell data according to said write signal output from said write signal generation means;

a lower address generation means for generating certain lower bits of the write address on said buffer memory for said communication cell data according to said write signal output from said write signal generation means;

a means for detecting an overflow of said buffer memory and outputting an overflow detection signal;

a means for inactivating said write signal according to said overflow detection signal; and a means for setting an address lower than a current address at said lower address generation means according to said overflow detection signal and for setting a write address composed of an upper address generated by said upper address generation means and a lower address generated by said lower address generation means as a writing start address for said communication cell data received next.

9. A communication data receiver as set forth in claim 8, wherein said lower address generation means is reset to zero according to said overflow detection signal whereby the write address composed of the upper address generated by said upper address generation means and the lower address generated by said lower address generation means is set as the writing start address for said communication cell data received next.

10. A communication data receiver as set forth in claim 8, which further comprises:

a first counter constituting said lower address generation means;

said first counter incremented by said write signal;

a second counter constituting said upper address generation means; and a means for checking a value read by said first counter and for resetting said first counter to zero and incrementing said second counter every time the read value coincides with the length of said received cell data.

11. A communication data receiver as set forth in claim 8, which further comprises:

a read signal generation means for generating a read signal for use in reading data from said buffer memory; and a counter incremented by said write signal and decremented by said read signal;

wherein said overflow detection means outputting said overflow detection signal when the value read by said counter coincides with the maximum address of said buffer memory.

12. A communication data receiver as set forth in claim 11, wherein:

said third counter sets the value as the result of subtracting an address value generated by said lower address generation means from the read value coinciding with said maximum address value as a new count start value according to said overflow detection signal.

13. A communication data receiver as set forth in claim 8, wherein:

said write signal generation means comprises a flip flop set by the logical product of said synchronizing signal and said start detection signal to output the write signal for said buffer memory; and said flip flop is reset by said overflow detection signal output from said overflow detection means to inactivate said write signal.

14. A communication data receiver for storing communication cell data received from a communication layer into a buffer memory and transferring said communication cell data to another communication layer, said communication data receiver comprising:

a means for detecting an overflow of said buffer memory;

a means for prohibiting said communication cell data from being written into said buffer memory according to said overflow detection; and a means for setting a write address lower than a write address of said communication cell data being written in said buffer memory as a writing start address for said communication cell data received next according to said overflow detection.

* * * * *